Figure 1:
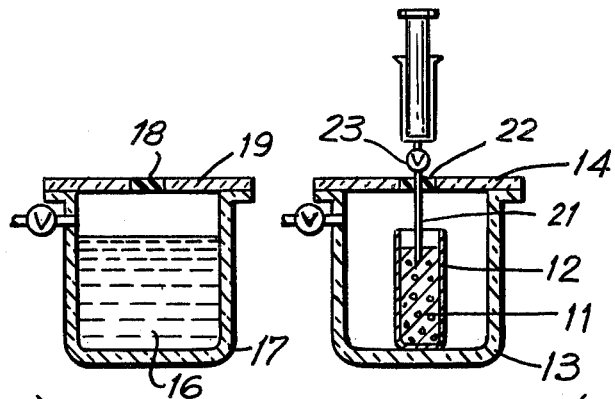

United States Patent [19]

Apfel

[11] 4,350,607

[45] * Sep. 21, 1982

[54] DETECTOR AND DOSIMETER FOR NEUTRONS AND OTHER RADIATION

[76] Inventor: Robert E. Apfel, 210 Goffe Ter., New Haven, Conn. 06511

[*] Notice: The portion of the term of this patent subsequent to Mar. 6, 1996, has been disclaimed.

[21] Appl. No.: 941,489

[22] Filed: Sep. 11, 1978

Related U.S. Application Data

[62] Division of Ser. No. 820,059, Jul. 28, 1977, Pat. No. 4,143,274.

[51] Int. Cl.$^3$ .................................................. C09K 3/00
[52] U.S. Cl. ............................... 252/408; 250/473.1; 23/230 R; 23/230.3
[58] Field of Search ................ 252/408; 250/473, 472, 250/474; 23/230 R, 230.3, 295 G, 919

[56] References Cited

U.S. PATENT DOCUMENTS

| | | | |
|---|---|---|---|
| 3,397,965 | 8/1968 | Berueffy | 23/254 R |
| 3,566,115 | 2/1971 | Swain et al. | 250/472 |
| 3,992,153 | 11/1976 | Ferber | 23/254 R |

Primary Examiner—Joseph L. Schofer
Assistant Examiner—J. L. Barr
Attorney, Agent, or Firm—Blum, Kaplan, Friedman, Silberman & Beran

[57] ABSTRACT

A radiation detector and dosimeter is based on the fact that a sufficiently finely-dispersed liquid suspended in a host liquid of high viscosity or gel is stable at temperatures above its normal boiling point for long periods of time provided it is protected from contact with walls, or other types of initiators which can cause volatilization or vaporization of the droplets. Radiation, and particularly neutron radiation of sufficient energy and intensity on coming in contact with such droplets can trigger volatilization. The volume of vapor evolved can then serve as a measure of radiation intensity and dosage.

21 Claims, 19 Drawing Figures

U.S. Patent  Sep. 21, 1982  Sheet 1 of 4  4,350,607

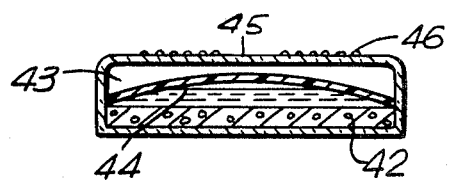
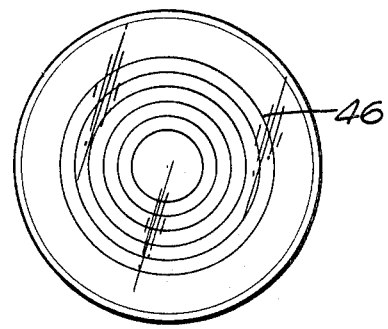
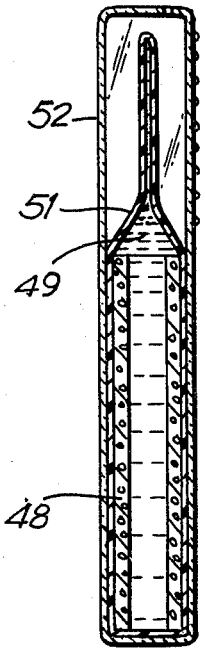
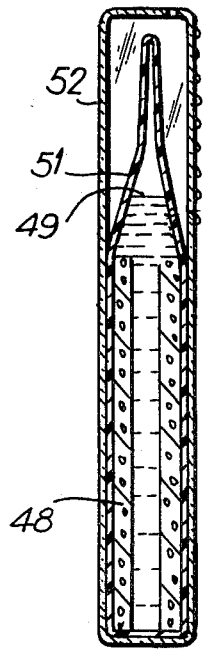
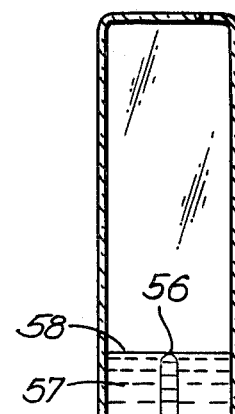
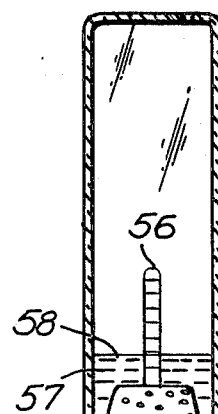

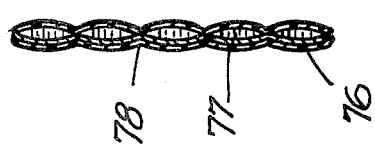
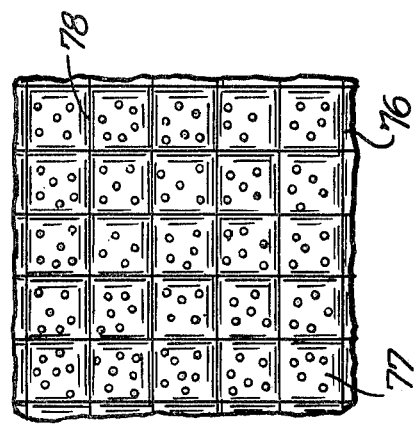
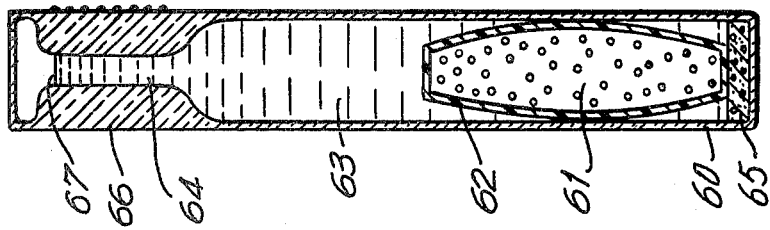
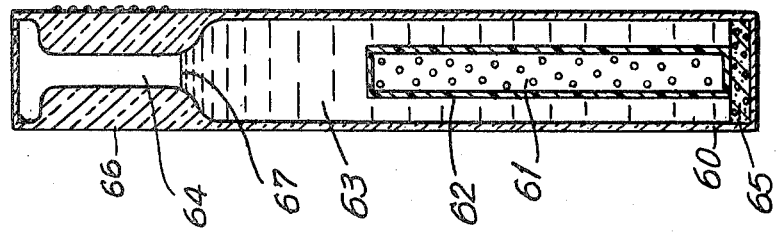
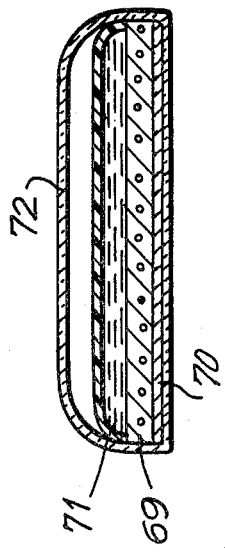

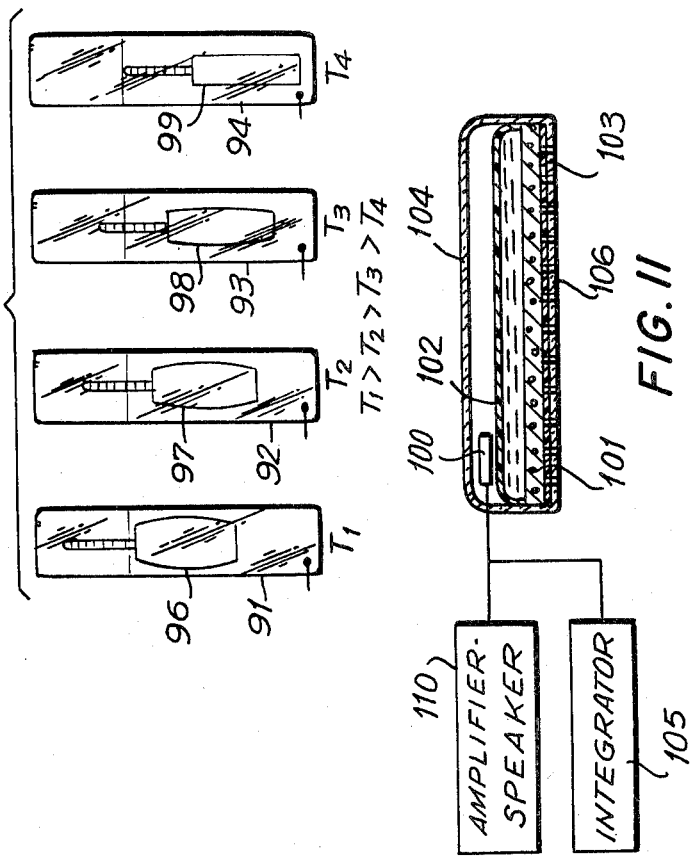
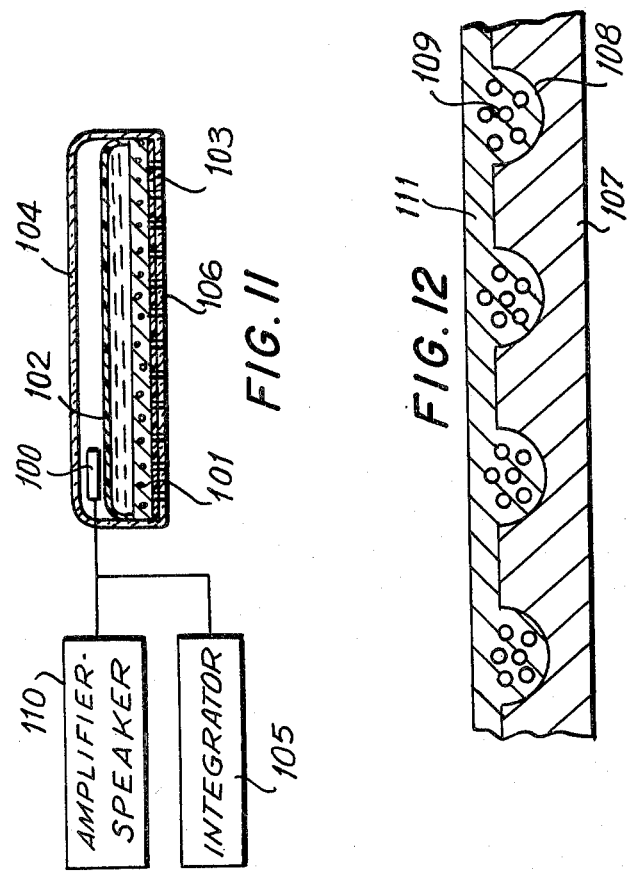
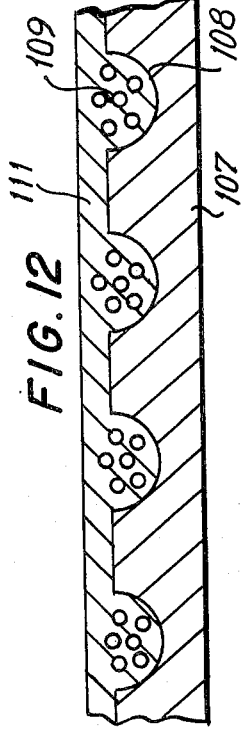
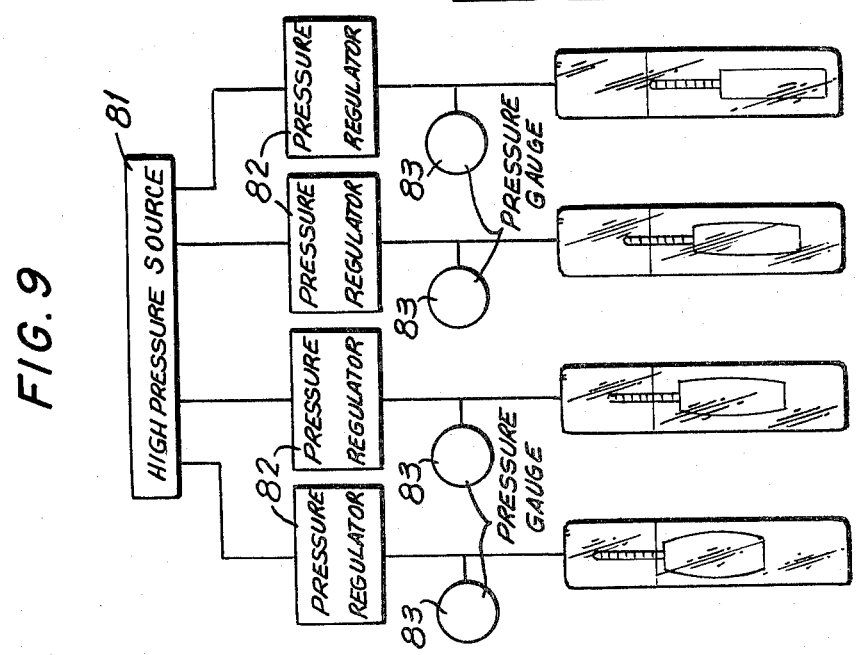

DETECTOR AND DOSIMETER FOR NEUTRONS AND OTHER RADIATION

The Government has rights in this invention pursuant to Grant No. ENG 75-02847 awarded by the National Science Foundation.

This is a division of application Ser. No. 820,059, filed July 28, 1977 now U.S. Pat. No. 4,143,274.

BACKGROUND OF THE INVENTION

The need for radiation dosimeters, especially of the type to be carried about by individuals, is well recognized. The most popular of the devices used at the present time is the photographic film badge in which the amount of radiation is determined by the number of tracks.

The track damage dosimeter is a device in which a very small track is left in the material (e.g. mica, polycarbonate) when hit by radiation. To make the track large enough to measure, an etching solution is applied, after which the number of tracks can be counted. The device, therefore, is indirect reading. It is not sensitive to gammas; it is sensitive to neutrons. To make this device work, fissionable radiation foils must be used that is, the wearer is exposed to radiation by the device which is designed to measure radiation. The exposure in one of these devices, despite a 2 mm lead shield, was 50 millirad per hour in the mica under the badge. Such devices are indirect reading; also, they cannot readily be adjusted with respect to the minimum energy, i.e. threshold energy, to which they will respond.

Also available are devices which employ electrometers which are sensitive to gammas and/or both neutrons and gammas. These devices are direct reading, but must be charged before use. They are fairly sensitive to vibration. (The electrometer may lose its charge thereby giving a false radiation reading). Devices of this type can be purchased for between $50.00 and $150.00 and thereafter need only be charged on-site so that there are no recurrent costs.

The thermoluminescent detector, known as TLD, is a solid state device in which the active element, after exposure to nuclear radiation, will luminesce on being heated. The integrated light flux produced is a measure of the radiation of a specific type to which the TLD has been exposed. By selection of appropriate materials, the TLD can be made to distinguish between different types of radiation. However, just as is the case with film badges, the TLD cannot be read directly, although on-site devices are available for reading the TLD.

The principle of radiation-induced nucleation of superheated liquids has been used in the bubble chamber; such a device has a relatively large volume of liquid under pressure. At the appropriate time the pressure is quickly dropped, thereby placing the liquid in the superheated state, radiation being incident on the sample. Bubbles form along the path of radiation under properly controlled conditions. A serious disadvantage is that the bubble chamber can be kept at the low pressure only for very brief periods of time before re-applying higher pressure, because bubble nucleation begins where it is not desired very quickly (on container surfaces and in the bulk).

Another device depending on superheated liquids is the ultrasonic bubble chamber. Like the regular bubble chamber, this device is used for tracking radiation. However, here the pressure is rapidly cycled acoustically e.g. an acoustic standing wave can produce regions where the pressure oscillates locally. In these regions a vapor bubble may form as radiation passes if the pressure has dropped sufficiently below the ambient pressure.

Skripov* has studied droplets of liquids which rise in a heated host liquid. At a certain point the droplets become superheated. The higher they rise, the more they become superheated. Eventually the droplets will vaporize at the "limit-of-superheat" for the given pressure. But if exposed to gammas, they will vaporize before they reach their "limit-of-superheat" temperature. Skripov has stopped these droplets by intercepting them with a glass dish. As long as a little of host liquid remains between the glass and the stopped droplet, the droplet will not vaporize prematurely.
*V. P. Skripov, *Metastable Liquids*. Halsted Press, John Wiley & Sons, New York, 1974 (Translation). Russian book published 1972.

As is evident, Skripov's research tool is not a practical device; it employs a single droplet or perhaps a small number, but not many; it does not integrate the effect over time because the vapor is not retained; the host material in many of Skripov's experiments is sulfuric acid—which is certainly an impractical liquid for personnel dosimetry.

Skripov and his colleagues also used capillary tubes filled with sensitive liquid material which could be superheated by dropping the pressure (same reference). These were exposed to radiation sources, and the time before vaporization could be measured. The capillary tube device is far less stable than the droplet method, i.e., the lifetime of a superheated liquid in a capillary tube is relatively short because of the large surface area in contact with glass (or quartz) and the large volume of liquid used. Heterogeneous nucleation, i.e. nucleation caused by solid particles or contact with walls, will cause vaporization of the liquid, making capillary tubes an impractical device as a radiation detector.

An acoustic field in a liquid produces an oscillating pressure field, thereby sensitizing (i.e. superheating) and desensitizing the liquid at the acoustic frequency. Also the high acoustic fields can be generated locally, away from container surfaces, thereby sensitizing only a relatively small volume. The interaction of radiation with liquid is noted by an acoustic cavitation event,—a vapor bubble (or bubbles) grows and collapses, making an audible snapping sound, which can be recorded. Unfortunately, heterogeneous cavitation can occur unless the liquid is very carefully filtered. Also, a cavitation event may provide heterogeneous nucleation sites, i.e. the liquid must be refiltered before achieving an acceptably clean liquid. However, it is not a practical device for monitoring because of the down time in between cavitation events.

As is evident then, although a variety of devices based on several different principles have been used for personnel monitoring, none of these has proved completely satisfactory. What is needed is a small, inexpensive device which is reliable and which can be monitored as frequently as desired without terminating the usefulness of the specific instrument as is the case when the film of a film badge is developed.

SUMMARY OF THE INVENTION

A liquid with a normal boiling point below the temperature at which it is to be used is dispersed in a host, the host consisting of a viscous liquid which may be termed a grease, or a soft gel. Either the grease or the soft gel must be sufficiently yielding so that on vaporization of a droplet the resultant vapor will occupy a volume appropriate to the ambient temperature and pressure. A suitable grease is a solution of a high polymer in water or gelatin softened with glycerol.

The dispersion of the sensitive (superheated) liquid in the host medium may be carried out by withdrawing a specimen from a pressurized chamber using a fine, hollow needle attached to a so-called "no-blow" syringe, and transferring the sensitive liquid through a septum into a specimen of the host medium in a pressurized chamber. The needle is moved about as the sensitive liquid is fed into the host medium, thereby producing fine droplets, preferably of size between 1 μm to 1 mm, with the chosen size depending on the particular application. In general, it is desirable to add a small quantity of a preservative such as sorbic acid when the host medium is gelatin or is any other material subject to bacterial decomposition.

The device depends for its usefulness on the fact that the number of interactions per second is independent of the size of the droplets but depends instead on the total volume of the sensitive liquid in the device. However, it is necessary that the droplet size and the total volume of liquid dispersed in the host in the device be scaled to the neutron density or flux expected to be encountered so that statistical reliability will be provided.

Accordingly, an object of the present invention is a device for determining neutron dosage.

Another object of the present invention is a device for determining neutron flux and integrating same.

A further object of the present invention is a device for determining personal neutron dosage over a selected period of time.

An important object of the present invention is a device for determining neutron dosage which does not require further development or treatment and which can be inspected periodically for determining integrated neutron dosage.

A significant object of the present invention is a method of determining neutron dosage both personal and in a given area.

A valuable object of the present invention is a method of determining neutron dosage by the use of superheated liquids in which individual droplets of superheated liquid are dispersed in individual compartments in a dosimeter.

Yet another important object of the present invention is a neutron dosimeter which provides information as to the distribution of energies in a neutron flux.

Still another object of the present invention is a radiation dosimeter for determining radiation flux and integrating same.

Still other objects and advantages of the invention will in part be obvious and will in part be apparent from the specification.

The invention accordingly comprises the several steps and the relation of one or more of such steps with respect to each of the others, and the composition possessing the features, properties and the relation of constituents, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 shows schematically how droplets of superheated liquid are dispersed in a host medium;

FIG. 2 shows apparatus for preparing film of a composition including a host medium with droplets of superheated liquid dispersed therein;

FIG. **3*a*** shows a side view of a badge-type detector based on the formation of a bubble, the volume of which is shown by graduations on the package;

FIG. **3*a'* is a front view of the detector of FIG. 3*a*;**

FIG. **3*b* is a side view of another embodiment of the badge-type detector of FIG. 3*a*;**

FIG. **3*b'* is a front view of the embodiment of FIG. 3*b*;**

FIG. **4*a*** is a detector in cylindrical form prior to use, said detector being based on the formation of a bubble, the size of which can be read on graduations;

FIG. **4*b* is the detector of FIG. 4*a*** subsequent to use;

FIG. **5*a*** is another embodiment of the invention prior to use, the neutron dosage being indicated by the extent to which a float rises in a buoyancy liquid;

FIG. **5*b* is the detector of FIG. 5*a*** subsequent to use;

FIG. **6*a*** is a further embodiment (prior to use) in which the determination of dosage is based on the volume expansion of a flexible packet;

FIG. **6*b* is the embodiment of FIG. 6*a*** subsequent to use;

FIG. 7 is a dosimeter in which the dosage is indicated by a color change;

FIG. **8*a*** is a front view of a dosimeter suitable for detection of neutron radiation over a substantial area;

FIG. **8*b* is a sectional view of the dosimeter of FIG. 8*a*;**

FIG. 9 indicates how embodiments of the present invention may be combined to yield an energy spectrum for radiation;

FIG. 10 is a further embodiment of apparatus for determining an energy spectrum;

FIG. 11 is an embodiment which is sensitive both to neutron radiation and to charged particle radiation; and FIG. 12 shows in section a sheet of host medium containing indentations each of which holds droplets of superheated liquid.

DESCRIPTION OF THE PREFERRED EMBODIMENTS

Generally speaking, the present invention is based on a superheated liquid dispersed in a soft host medium. The superheated liquid generally has a boiling point at 760 mm of mercury between about −40° C. and +10° C. where the liquid is to be a component in a device used for personnel dosimetry. In general, for any specific application, the boiling point of the liquid must be lower than the use temperature at the ambient pressure, thus ensuring that the liquid is superheated, and therefore, "sensitive".

There is a limiting temperature to which any liquid can be superheated, this limiting temperature being known as the "homogeneous nucleation limit". A liquid such as Freon 114 ($C_2Cl_2F_4$, made by Dupont) and also made by Union Carbide under the tradename Ucon 114, has a boiling point of 3.8° C. but a homogeneous nucleation limit of about 110° C. Calculations show that for a volume of 0.005 ml of sensitive liquid, homogeneous nucleation will take place in about 17 minutes if the temperature of the liquid is 1° C. below the homogeneous nucleation limit. This theoretical waiting time rises to one-half year for 2° C. below this limit and one million years for 3° C. below this limit. Consequently, to avoid homogeneous nucleation, the compositions of subject invention should be used at temperatures at least 2° C. and preferably 3° C. below the corresponding homogeneous nucleation limiting temperatures.

Nucleation can also occur heterogeneously, i.e., as the result of pre-existing bubbles, solid impurities and contacts with the wall of a container.

Other suitable liquids are butane, 1-butene and cis-2-butene.

Where the compositions of subject invention are to be used for the detection of incident radiation, the energy of the incident radiation must be above a specific threshold or minimum level, at which point there is a measurable rate of interaction. For neutron radiation, the probability of interaction of a single neutron with a nucleus of an atom is extremely small, but with a sufficiently large number of nuclei, as determined by the volume of sensitive material, the probability of interaction can be brought to a useful range. The number of interactions per second $\phi$ is given by the formula $$\phi = c\psi V \sigma$$

where V is the total volume of the sensitive liquid and $\sigma$ and c are the cross-section for interaction and a constant respectively, for the given liquid. The cross-section for interaction is determined by direct measurement. Typical cross-sections are of the order of $10^{-24}$ cm$^2$ (1 barn) for neutrons in the energy range of 1-10 MeV. $\psi$ is the flux of neutrons per square centimeter per second.

It should be noted that the number of interactions per second depends upon the total volume of the sensitive liquid and is independent of the degree to which the volume is divided into drops. Thus, if the volume is divided into n drops, the number of interactions for each drop per second is $\phi/n$. If a dosimeter is designed so that only a small fraction, f, of droplets will vaporize in the use time of the dosimeter, then the interaction rate will remain very close to $\phi$. Consequently, for a given liquid and for a given incident flux of neutrons, the interaction rate will depend only on the total volume of sensitive liquid. Assuming there are enough interactions for statistics to be valid, then the total volume of vapor generated by interactions will be proportional to the incident flux. Moreover, the sensitive droplets need not be uniform in size, even if the total number of interactions is small compared to the total number of droplets. As a typical example, for Freon 114 at room temperature, the interaction rate is about $3.5 \times 10^{-3} V\psi$ where V is in cm$^3$ and $\psi$ is the number of neutrons per square centimeter per second. For a flux of 10 neutrons/cm$^2$/s, which is about the maximum allowable rate for radiation workers and for the case where V=1 cm$^3$, the interaction rate is about 0.035/s or about two per minute. The actual volume of sensitive material required for a practical dosimeter depends on the sensitive liquid used, the desired interaction rate, the desired time during which the dosimeter is to be used and the expected incident flux.

Still considering Freon 114 at room temperature, the interaction rate $\psi$ for 1-10 MeV neutron-induced vaporization is equal to $3.5 \times 10^{-3} \psi V$. To calculate once more the volume of composition necessary for a fast neutron flux of 10 neutrons/cm$^2$/s, it may be assumed that the rate of one interaction per 10 minutes (600 seconds) would be an acceptable rate (about 50 interactions per 8 hour day). Then, using the above formula, it is found that V=0.05 cm$^3$.

In order to maintain the same interaction rate over the duration T of the use of the dosimeter, the number of droplets should be large compared to the total number of interactions ($\phi \times T$), so that the sensitive liquid volume remaining is close to the original volume. Then, continuing the above example, for a dosimeter to be effective for one week (40 hours), the number of droplets should be greater than about $5 \times \phi \times T = 1200$ droplets.

The average volume of a drop is equal to the total sensitive volume divided by the total number of drops. For the present example this works out to $4.17 \times 10^{-5}$ cm$^3$. The diameter of such a drop is 0.43 mm. In general, the droplet size does not influence the interaction rate, the rate depending on the total volume of sensitive liquid in the device. Also, the smaller the diameter of the drop, the smaller the resulting vapor volume. When the drop is vaporized, droplet sizes can range from about 1 $\mu$m to 1 mm, with the chosen size depending on the particular application.

To increase the statistical reliability of results, it is desirable that droplet size be relatively uniform. Where droplets are dispersed by syringe, droplets of uniform size can be produced by moving the tip of the syringe after a selected volume of liquid has been extruded from said tip. As a further means of increasing the statistical reliability, the rate of triggering by a unit volume of sensitive liquid can be increased. Specifically Freon 12 is far more sensitive than Freon 114. Also, a greater volume of sensitive liquid will produce more vapor in a selected time interval. Thus, 2 ml of Freon 12 exposed to a flux of 10 neutrons/cm$^2$/sec. would give an interaction every 2 seconds as compared with Freon 114 which would produce interactions at a rate of one every 600 seconds.

To prepare a composition in accordance with the present invention, a sensitive liquid is selected for dispersion in an appropriate host medium. The host medium should be a material of sufficiently high viscosity so that during the dispersion process the droplets formed will be encapsulated by the host medium and will remain encapsulated whether the medium retains its initial viscosity or the viscosity increases as is the case with solutions of gelatin. A small quantity, i.e., from about 0.05% to about 0.3%, of a dispersing agent, or emulsifying agent may be used to facilitate dispersion of the sensitive liquid in the host medium. The presence of such a dispersing agent makes it possible to prepare satisfactory compositions with hosts of relatively low viscosity. Polymers which coat the droplets also make it possible to prepare low viscosity compositions. The process of manufacture is illustrated by the following examples.

EXAMPLE I

Gelatin Gels

To 100 parts of distilled water, 4% by weight of Knox brand gelatin was added. The mixture was heated until the gelatin dissolved. To the resultant quantity of liquid gelatin an equal weight of glycerol was added. Ratios of glycerol to gelatin solution ranging from 0.5 to 2 have been found useful. Also, gelatin solutions ranging in concentration from 3% to 5% have been found useful. The gelatin solution should contain from about 0.1% to 0.5% of sorbic acid or other suitable preservative.

The gelatin-glycerol solution, henceforth termed "composition" and indicated by the reference numeral 11 in FIG. 1 was placed in a vial 12 in a pressure chamber 13 sealed with a cover 14 and pressurized.

A sensitive liquid, in this case Freon 114 and indicated by the reference numeral 16 was stored in a pressurized container 17 also having a septum 18 in a cover 19. The pressure in the container was maintained at a level sufficient to prevent the liquid from boiling.

A syringe of the no-blow type was inserted into the reservoir and a volume of liquid was withdrawn therefrom, the syringe being constructed with a valve thereon to maintain the liquid under pressure during storage in the syringe and transfer. The needle 21 of the syringe was inserted through the septum 22 in pressure chamber 13 and into host medium 11 in vial 12. The syringe valve 23 was opened and droplets of the sensitive liquid were injected into host medium 11. During the injection, the needle was manipulated so that droplets would be formed at reasonable intervals, it being desired to avoid placing the droplets close together since triggering of one drop by volatilization of another may occur when the spacing between the droplets is small.

The syringe needle was withdrawn after injecting about 50 drops of 0.5–1.0 mm diameter into the host medium. The pressure in the chamber was then dropped to atmospheric and the vial was removed. The droplets in the host medium at this point became superheated since the sensitive liquid was at a temperature above its normal boiling point, that is, the boiling point at atmospheric pressure.

Generally, the gelatin sets prior to dispersing the droplets therein, but the gel is sufficiently soft as the result of the addition of the glycerol so that the needle can be moved about therein and droplets can be formed in the gel without causing permanent disruption of the gel.

Most important, the gel is sufficiently soft so that on vaporization of a droplet by interaction with a neutron, the vapor formed occupies a volume corresponding to the ambient temperature and pressure. Furthermore, if the droplet is close to the surface of the gelatin, the bubble formed will break the surface of the gelatin and emerge into the space above the gel.

EXAMPLE II

Aquasonic 100 Gel Preparations (Parker Laboratories, Irvington, N.J.

Aquasonic 100 is a water-soluble gel containing a vinyl polymer dissolved in water. To the gel were added varying amounts of water and/or glycerol. A suitable host medium consists of equal quantities (by weight) of glycerol and gel. Another suitable host medium consists of 1 part gel, 0.25 parts water and 0.25 parts glycerol, all parts being by weight. Yet another suitable host medium consists of 1 part Aquasonic 100, 2 parts of glycerol and ½ part of water, all parts being by weight. The ratio of glycerol to Aquasonic 100 can be between about 0:1 and 2:1.

The Aquasonic 100 compositions were produced by vigorous mixing of the liquids until a uniform composition was formed. During the process some bubbles were produced. These were eliminated by outgassing under vacuum. They can also be eliminated by subjecting the compositions to hydraulic pressurization to 5,000–10,000 psi for about 20 minutes.

Aquasonic 100 solutions with added glycerol and with or without added water were placed in the pressure chamber of FIG. 1 and droplets of Freon 114 were dispersed therein in the same manner as described with respect to the gelatin gels. The resultant compositions proved to be satisfactory for detection of neutron radiation.

EXAMPLE III

Miscellaneous

A hair-setting gel sold under the name of "Dippity Doo" (Gillette Co.) was placed in the pressurizable chamber and Freon 114 was dispersed therein. The product proved to be satisfactory for detection of neutron radiation.

Similar results can be obtained using a variety of greases such as those based on the polyethylene oxides. It is only necessary that the droplet be encapsulated in a microscopically smooth material which will not initiate vaporization, and which will give way when radiation has initiated vaporization.

The stability of the product can be greatly enhanced by placing the composition in a liquid-filled plastic bag and hydraulically pressurizing at a sufficiently high pressure for a sufficient period of time to eliminate all minute gas bubbles. A suitable pressure is 10,000 psi and a suitable time is 20 minutes at this pressure.

EXAMPLE IV

Freon 114 is denser than water, and when injected into gelatin which has not as yet set the sensitive material will be encapsulated in the gelatin and will fall to the bottom of the vial and aggregate there. The droplets do not coalesce because they are coated by the gel. After injecting the droplets, the chamber pressure is reduced to atmospheric pressure and the vial removed. The droplets do not vaporize and remain stable. The contents of the vial, including the droplets, can then be poured into a dish from which the individual droplets can be pipetted into any desired substrate. Thus, considering a substrate which is a sheet having a series of indentations, a single droplet can be pipetted into each indentation. To avoid premature droplet vaporization, the substrate is kept at a temperature below the boiling point of the sensitive liquid. Once the substrate is prepared, the auxiliary procedure of hydraulic pressurization will assure long term stability of the drops.

EXAMPLE V

Low Temperature Dispersal of Drops in Host Material

In order for this procedure to be effective, it must be possible to cool the gel below the normal boiling point of the sensitive liquid without freezing the gel.

The sensitive liquid and the gel are brought to a temperature below the normal boiling point of the sensitive liquid. The gel is placed in a suitable holder or on a suitable substrate. A syringe is filled with the sensitive liquid and droplets of the sensitive liquid are injected onto the substrate at desired positions. Once the droplets are covered with gel, the resultant dispersion can be allowed to warm up to the desired operating temperature and fabricated into a suitable package.

EXAMPLE VI

Figure 2:
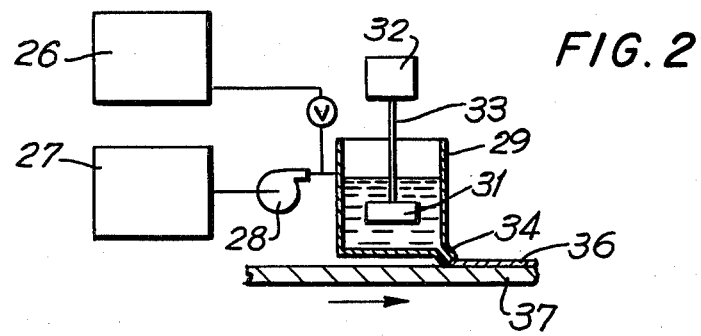

A suitable composition can be prepared by the use of emulsification equipment. Thus, as shown in FIG. 2, tank 26 contains a host medium and tank 27 contains the sensitive liquid to be dispersed. Both tanks are pressurized and the materials are fed by the use of a pump 28 or by gravity and pressure drop to chamber 29 containing an emulsification rotor 31 driven by motor 32 through shaft 33. The dispersion emerges through slot 34 in the form of a film 36 on metal sheet conveyor belt 37. The sheet is chilled to cause rapid setting of the film.

Sensitive dispersions made in accordance with the methods described were tested against a plutonium-beryllium source emitting about $1.85 \times 10^6$ neutrons/second with energies below 10 MeV. Tests were also made with gamma sources including a cobalt 60 source (having energies of 1.33 and 1.77 MeV) and accelerator sources (energies at 6 MeV and at 25 MeV). An electron source from an accelerator had energies at 7, 10, 13, 16, 19, 22, 25 and 32 MeV.

Freon 12 ($CCl_2F_2$), also known as Ucon 12, is superheated by 50° C. at room temperature. It showed great sensitivity to the neutron source, but no response to the strong cobalt 60 source, and extremely small interaction rates for 6 MeV gamma rays and a high interaction rate for 25 MeV gamma rays. This liquid showed only a low interaction rate for electrons, even at high energies.

Freon 114 also known as Ucon 114, ($C_2Cl_2F_4$) is superheated by 19° C. at room temperature. It is sensitive to neutrons but at a lower interaction rate than Freon 12, has no sensitivity to the cobalt 60 or the 6 MeV gamma source, and only a low interaction rate for the 25 MeV gamma source. It has a very low interaction rate for electrons above 13 MeV.

Butane is superheated by about 23° C. at room temperature. It was tested only against 6 MeV gamma rays, but gave virtually no response.

Following are a number of compounds suitable for use at normal ambient temperatures, the differences in boiling point providing differences in the degree of superheat and thus a range of sensitivities:

| Compound | Boiling point, °C. 760 mm Hg |
|---|---|
| $C_2Cl_2F_4$ sold as Ucon 114 by Union Carbide and Freon 114 by Du Pont | 3.8 |
| $CCl_2F_2$ sold as Ucon 12 or Freon 12 | −29.8 |
| n-butane, $C_4H_{10}$ | 0.5 |
| 1-butene, $C_4H_8$ | −6.3 |
| cis-2-butene, $C_4H_8$ | 3.7 |
| 2,2-dimethyl propane, $C_5H_{12}$ | 9.5 |

Solutions of a sensitive compound in another sensitive compound are also useful, such solutions providing control over the degree of superheat.

As is evident, these results indicate that superheated liquids are preferentially sensitive to neutrons and insensitive to gamma rays at energies below 6 MeV, a very desirable feature in a neutron detector device. However, where radiation of other types to which the superheated liquid is sensitive is present and it is desired to distinguish between neutron radiation and such other types, shielding may be incorporated in a device within the scope of the present invention. Thus, charged particles are effectively blocked by a layer of glass and a layer of lead sheet will prevent triggering by gamma rays.

Figure 3A:
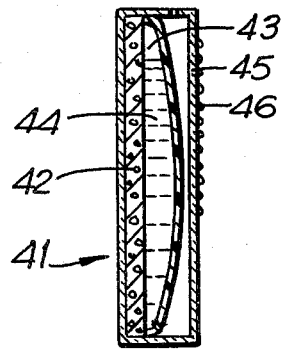
Figure 3A:
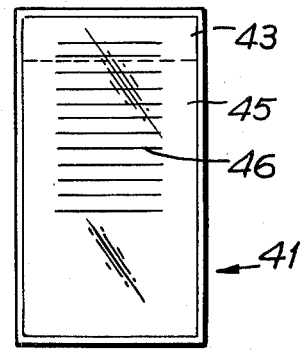

A wide variety of dosimeters for various applications can be prepared. FIGS. 3a and 3a' show a badge-type detector, indicated generally by the reference numeral 41, which contains a sheet 42 of a composition consisting of a sensitive liquid dispersed in a host medium which is a gel. Desirably, the gel has therein a preservative such as sorbic acid in small quantity when the gelling agent is subject to bacterial attack. Container 45 is preferably of glass, the wall of the container serving as a shield against charged particles.

When a neutron interacts with a droplet and initiates vaporization, the vapor escapes into vapor space 43 above inert liquid 44. In the rectangular configuration of FIG. 3a the volume of the separated vapor bubble 43 is measured by means of graduations 46 on the exterior of the package.

A somewhat similar structure is shown in FIGS. 3b and 3b' except that the package is circular in format and must be placed on a horizontal surface for reading. The graduation marks are concentric circles, and may be such that they relate bubble volume to radiation dose.

Both of these embodiments depend upon the fact that when the droplet vaporizes it vaporizes in a direction which is perpendicular to the host substrate, passing into the immiscible liquid 44.

A cylindrical embodiment having a "pen" format is shown in FIGS. 4a and 4b wherein the composition is in the form of a sheet 48 rolled up and is a cylinder as shown. The sheet is immersed in inert liquid 49 filling flexible transparent plastic cylindrical bag 51 which is initially collapsed as shown in the left-hand portion of FIG. 4. The assembly is contained in a transparent graduated shield 52, the shield being rigid. After exposure to radiation, the vapor formed by volatilization of radiation-triggered droplets and the degree of expansion can be read against the graduation marks on the shield.

FIGS. 5a and 5b show an embodiment resembling a hydrometer. The sensitive liquid dispersed in the host, indicated by the reference numeral 54, is in a plastic bag which can expand. Affixed to the top of each bag is a vertical rod bearing graduation marks, and the entire assembly is immersed in an inert liquid 57. The density of the liquid is selected so that the plastic bag containing the sensitive composition floats with most or all of the rod portion thereof submerged prior to exposure to radiation. Preferably, the top of rod 56 is initially at the same height as the surface 58 of inert liquid 57.

When the device is brought into a region of neutron irradiation, droplets of sensitive liquid are vaporized and the buoyancy of the bag increases, causing the bag to rise so that the rod protrudes above the surface of the inert liquid. From the distance which rod 56 protrudes above the surface of the liquid, the volume of liquid vaporized can be calculated and from this volume the total quantity of neutron flux integrated over the radiation time becomes known.

The embodiment shown in FIGS. 6a and 6b is of the "thermometer" type. A composition 61 containing droplets of superheated liquid in a host medium is in a plastic expandable bag 62, bag 62 being anchored to the bottom of container 60 by cement 65. On exposure to radiation droplets vaporize and the bag expands, displacing inert liquid 63 up into narrow portion 64 of container 66. Narrow portion 64 is graduated and from the position of the surface 67 within the graduated portion, the volume of vapor and the total quantity of radiation exposure can be calculated.

FIG. 7 shows an embodiment in which the droplets of sensitive liquid in the film 69 of sensitive composition contain a source of color such as a dye or an acid or a base. Above the film of sensitive composition is a layer of inert liquid 71 which may contain an acid-base indicator. Alternatively, liquid 71 may be a solvent for the dye, showing its color. The color can be observed through transparent shield 72. Affixed to the back of the assembly may be a color chart 70 which relates the radiation dose to color.

FIGS. 8a and 8b show a radiation dosimeter applicable to measuring radiation dose over a relatively large area. A compartmentalized container 76 shows radiation dosage at each compartment 77, using a technique such as that shown in FIGS. 3a and 3b where the separation of a bubble is a measure of radiation dosage at each compartment. Partitions 78 between compartments are formed by standard sealing techniques.

It has been found that the minimum energy necessary to trigger vaporization of a droplet of a superheated liquid depends upon the nature of the liquid. Consequently, by utilizing a plurality of packets of superheated liquid, each packet containing a different superheated liquid, an energy spectrum can be obtained. The same effect can be achieved by having several dosimeters of the same sensitive liquid each at a different pressure. The highest pressure must be less than the vapor pressure of the liquid at the temperature of use of the dosimeter, since otherwise, the liquid will not be superheated, and hence will be insensitive to radiation. Within this limit, the higher the pressure, the greater the energy threshold. FIG. 9 shows such an assembly using the hydrometer type of instrument. All of the containers are connected to a single high pressure source 81 through individual pressure regulators 82, each container being also fitted with a pressure gauge 83. Each regulator is set at a different value, thereby settting the minimum energy which a neutron must have in order to interact with the particular sensitive liquid selected.

FIG. 10 shows an energy spectrometer based on temperature difference. Each of the buoyancy-type devices is maintained at a different temperature so that the degree of superheat is different for each device. In the spectrometer shown in FIG. 10, device 91 is at the highest temperature and devices 92, 93 and 94 are at successively lower temperatures. Since the degree of superheat is greatest for device 91 which is at the highest temperature, the frequency of interaction will be greater and the expansion of bag 96 will exceed those of bags 97, 98 and 99.

As is obvious, other types of detectors than the buoyancy-type would also be effective for the purpose indicated. Further, as aforenoted, an energy spectrometer can be used on the basis of the use of different superheated liquids. Particularly advantageous is the use of two miscible liquids mixed in varying proportions where the two liquids have widely different threshold energies for triggering.

FIG. 11 shows an embodiment of the present invention which is sensitive both to neutrons and to charged particles. A layer 101 of dispersed droplets in a host has a flexible membrane 102 thereover and a thin plastic sheet 103 thereunder. The plastic enclosure is held in a transparent shield 104 of a material such as glass, said shield being continuous on the top portion thereof and perforated on the lower portion thereof, said lower portion being indicated by the reference numeral 106. Neutrons can enter the sensitive composition 101 either from above or below and charged particles can enter through the perforations in the lower face of the device.

In the embodiment of FIG. 12, a substrate 107 has indentations 108 therein in each of which there are a plurality of droplets 109 of a sensitive liquid. The droplets are embedded in a host substance 111 which is either a grease or a soft gel. Such a sheet is useful for determining area distribution of neutron flux. It may be shielded from gamma rays, dust, etc., by any of the means made obvious in the other embodiments disclosed herein.

It has been noted that triggering of a droplet is accompanied by an audible sound. The sound can be amplified by appropriate apparatus to signal entry of the wearer into an area of high neutron flux. Also, as is evident, any of the devices disclosed herein can readily be modified to sound an alarm when a specific volume of vapor has been generated. Such an apparatus is shown schematically in FIG. 11 in which sensor 100 is connected to amplifier-speaker 110 to signal each volatilization of a droplet. In addition, sensor 100 can be connected to integrator 105 to sound an alarm by means of amplifier-speaker 110 when a specified dosage has been received. Also, an alarm can be emitted when the volume of vapor evolved reaches a selected value.

It should be noted that so far as detection of neutrons is concerned, neither the material of which the containers are constructed nor the nature of the host composition is significant. The reason is that for water and for paraffin, for instance, which are among the most effective absorbers of neutron radiation, there is negligible shielding effect where the thickness of the material under consideration is less than about 3 cm.

It will thus be seen that the objects set forth above, among those made apparent from the preceding description, are efficiently attained and, since certain changes may be made in the above composition of matter and in the article including said composition of matter, without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A composition including droplets of superheated liquid encapsulated in a host immiscible therewith, said host being a member of the group consisting of viscous liquids, greases and soft gels, said viscous liquid and grease being of high enough viscosity to protect said droplets from initiation of vaporization by contact with a wall, and said gel being soft enough to allow essentially the full volume change corresponding to the vaporization of any droplets at the ambient temperature and pressure about said gel, said composition being useful in the detection of radiation.

2. The composition as defined in claim 1, wherein said gel consists essentially of gelatin, water and glycerol.

3. The composition as defined in claim 1, wherein said gel consists essentially of 100 parts of 3% to 5% gelatin in water, and 50 to 200 parts of glycerol, all parts being by weight.

4. The composition as defined in claim 1, wherein said gel is a high polymer dissolved in water in combination with glycerol as said softener.

5. A composition as defined in claim 1, wherein said superheated droplets are of a member of the group consisting of $C_2Cl_2F_4$, $CCl_2F_2$, n-butane, 1-butene, cis-2-butene, 2-2 dimethyl propane, and miscible combinations thereof.

6. The composition as defined in claim 1, wherein said droplets range from about 1 μm to about 1 mm in size.

7. The composition as defined in claim 1, wherein said composition is in the form of a film sufficiently thin so that expansion of a droplet on vaporization will take place principally forward and out of the surface of said film.

8. The composition as defined in claim 1, further comprising a coloring means in said superheated liquid for producing a color in a second liquid contiguous with said composition, said coloring means being a member selected from the group consisting of dyes, acids and bases, said second liquid being a solvent for said member when said member is a dye, and containing in solution therein an acid-base indicator when said member is an acid or a base.

9. A method of preparing a stable composition including a superheated liquid, comprising the step of dispersing a liquid in a host selected from a group consisting of viscous liquid, greases and soft gels, said liquid being immiscible with the members of said group, the boiling point of said liquid at the pressure at which said composition is to be used being lower than the ambient temperature at said pressure, said composition being useful in the detection of radiation.

10. The method as defined in claim 9, wherein said dispersal is carried out at approximately room temperature at superatmospheric pressure.

11. The method as defined in claim 9, wherein said dispersal is effected at a temperature below the normal boiling point of said liquid, said host being liquid at said temperature.

12. The method as defined in claim 9, wherein said step comprises the substeps of withdrawing a volume of said liquid from a pressurized reservoir, dispersing said volume of liquid in said host in a chamber at a pressure greater than the vapor pressure of said liquid at the ambient temperature of said host.

13. The method as defined in claim 12, further comprising the substep of releasing the pressure over said host.

14. The method as defined in claim 9, wherein said dispersal is effected by an emulsifier.

15. The method as defined in claim 12, wherein said dispersal is effected by a syringe needle inserted into said reservoir through a septum for withdrawing said volume and into said host through a septum in said chamber, said needle being moved about to form droplets of liquid in said host as said liquid is dispersedly injected into said host.

16. The method as defined in claim 9, wherein said liquid is injected dropwise by syringe needle means into each of the compartments in a compartmented sheet holding host in said compartments.

17. The method as defined in claim 9, wherein said dispersing of said liquid in a host is effected in a vessel having an exit slit therein and further comprising the step of feeding the resulting dispersion through said slit in thin sheet form onto a chilled moving belt.

18. The method as defined in claim 9, further comprising the step of hydraulically pressurizing said composition at a pressure and for a time long enough to cause solution of any gas bubbles present, thereby minimizing the possibility of triggering vaporization of said droplets by contact with gas bubbles.

19. The composition as defined in claim 1, wherein said host consists essentially of a high polymer dissolved in water.

20. The composition as defined in claim 19, wherein said high polymer is polyethylene oxide.

21. The composition as defined in claim 1, wherein said dispersed, superheated liquid comprises at least two different compounds miscible with each other for controlling the degree of superheat in use.

* * * * *